United States Patent [19]

Broberg et al.

[11] 4,269,655

[45] May 26, 1981

[54] DEVICE FOR CONCENTRATION OF MINERAL ACIDS, PARTICULARLY SULPHURIC ACID

[75] Inventors: Hans Broberg; Lars Dourén, both of Karlskoga; John Troeng, Lund, all of Sweden

[73] Assignee: Aktiebolaget Bofors, Bofors, Sweden

[21] Appl. No.: 41,220

[22] Filed: May 21, 1979

[30] Foreign Application Priority Data

Jun. 21, 1978 [SE] Sweden ................................. 780706

[51] Int. Cl.$^3$ ............................................. B01D 1/22
[52] U.S. Cl. ................................................ 159/13 A
[58] Field of Search ....... 122/21; 159/13 A, DIG. 19; 203/12

[56] References Cited

U.S. PATENT DOCUMENTS

| 2,758,061 | 8/1956 | Geller | 159/13 A |
| 4,164,441 | 8/1979 | Kühnlein et al. | 159/13 A |

Primary Examiner—Anthony V. Ciarlante

[57] ABSTRACT

The present invention provides a unique structure for concentrating mineral acids, and particularly sulphuric acid wherein a plurality of long quartz tubes extend vertically through a furnace and have vertically lower ends in communication with a receiving vessel. The quartz tubes are surrounded by tube units and flow passageways are created on either side of the tube units for directing hot combustion gases along the quartz tubes, providing convective and radiative heat transfer to the tubes as required to heat the acid flowing therethrough. An assembly is positioned for generating turbulence within the gas flow passageway to achieve a vigorous turbulence of the hot combustion gases.

22 Claims, 15 Drawing Figures

DEVICE FOR CONCENTRATION OF MINERAL ACIDS, PARTICULARLY SULPHURIC ACID

BACKGROUND ART

The present invention relates to a device for concentration and possible purification of mineral acids, particularly sulphuric acid.

In devices for concentration of, for instance, sulphuric acid there is quite generally a need for the device in question to be flexible as regards adaptation to capacity, variation in composition of the residual acid which is to be concentrated, etc. At the same time it should be capable of meeting requirements for good operating economy and operating reliability, and also a long life. Further, for obvious reasons, it must fulfill the specified environmental requirements.

OBJECTS AND SUMMARY OF PRESENT INVENTION

A purpose of the present invention is to create a device which environmental requirements, and the feature that can mainly be considered to be indicative of the new device is that it comprises a furnace that can be heated for generating hot heating gases (combustion gases) and one or a plurality of long quartz tubes extending vertically through the furnace which are sealed in relation to the furnace at their upper and lower parts. The acid in question of a first concentration can be fed in to the upper parts and acid of a second concentration higher than the first one can be drained off at the lower parts into a collecting vessel or the like. There are means arranged in the furnace which gives rise to convection of said heating gases wherein the parts of the quartz tube which are inside the furnace are parallel to and extending around the quartz tube flow channels which are arranged to allow the heating gases to pass through. At least in part of said flow channels turbulation means are arranged to achieve a vigorous turbulence of the heating gases.

In further developments of the concept of the present invention there is also proposed an embodiment for parts comprised in the high-temperature part of the device which enable concentrations of sulphuric acid of up to 97% and more, i.e. said parts permit transmission temperatures to the acid in question which is to be purified of approx. 320° C. Due to the fact that the device can work with such high temperatures, the advantage is also achieved in that organic impurities in the acid in question can be destroyed without residue at all events if an appropriate oxidation agent is added in connection with the concentration process. Said temperatures involve with the strongly corrosive sulphuric acid thereby obtained makes it necessary to use quartz tubes, which involves special installation problems, due to the very low coefficient of expansion of the quartz material, and its poor strength properties. However, these problems are also solved through additional features of the new device comprising the present invention.

BRIEF DESCRIPTION OF THE DRAWINGS

A preferred embodiment of the present invention comprises a device which will be described in detail hereafter, with reference to the accompanying drawings, in which:

FIGS. 4b–4d show enlargements of various parts of the tube unit according to FIG. 4a;

FIG. 5 shows a horizontal section having supporting plates for a number of quartz tubes and tube units formed according to FIGS. 3 and 4a;

FIGS. 6a–6c show horizontal and vertical sections of a sealing arrangement between an outlet channel and the tube unit according to FIG. 4a;

DETAILED DESCRIPTION OF THE PREFERRED EMBODIMENT

The facility described in the following is primarily intended for concentration of suphuric acid, and is to a certain extent based upon the so-called evaporation technique. This provides that sulphuric acid from which nitric acid has been removed is allowed to run along the inside of a quartz tube, which is heated from the outside with heating gases, e.g. combustion gases, from an oil burner. The water content in the sulphuric acid is thereby evaporated. For high concentrations of sulphuric acid, heating temperatures of up to 320° C. are required, which temperatures are sufficiently high so that the organic impurities present will be destroyed without residue, at least when an appropriate oxidation agent (e.g. nitric acid) is added, whereby that the device described hereafter also serves as a purification device. The acid concentration device shown is moreover primarily intended for used sulphuric acid from nitration processes and the like, i.e. sulphuric acid contaminated mainly with reasonable quantities of organic substance.

Figure 1:
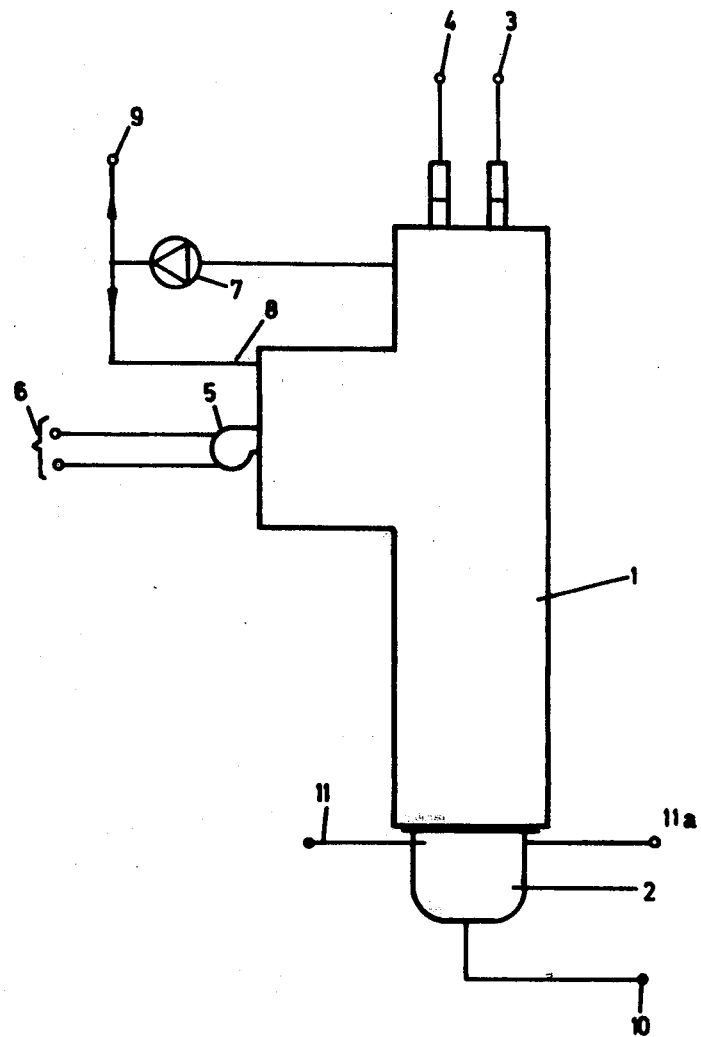
FIGS. 1 shows a skeleton diagram of a concentration device which is included in a system for handling residual acid, not shown in detail.

In FIG. 1, a skeleton diagram of a concentration device formed according to the present invention is shown and designated by the numeral 1, with a collecting vessel or container for acid concentrated in the device designated by numeral 2. The acid which is to be concentrated is fed in inlet pipes 3 and 4. The concentration device comprises a furnace that can be heated to generate hot combustion gases by means of an oil burner 5, to which fuel oil and air are conveyed via pipes 6. A suction fan connected to the furnace is designated 7, which fan in the embodiment shown has a capacity on the order of 13000 m³/h. The system has a return pipe 8 for part of said combustion gases, which are returned to the combustion chamber of the furnace in order to make it possible to maintain a constant temperature of said hot combustion gases. The fan also conveys combustion gases to an air circulator via a connection 9. The air circulator provides the flow of air for the burner 5. The concentrated sulphuric acid is conveyed off from the vessel 2 via an outlet pipe 10.

Cold HNO$_3$ is fed via a pipe 11. A balance pipe is designated 11a.

In accordance with inter alia FIGS. 2a and 2b, the device 1 comprises a number of long quartz tubes 12 (cf. also FIG. 3) which respectively are arranged in a tube unit 13 (cf. also FIG. 4a) in the way to be described in more detail in the following. In the example of the embodiment, the quartz tubes have a length of approx. 5 meters, but can in principle vary between, for example 3 and 10 meters. Furthermore, the inner diameter is approx. 125 mm, and appropriate variations for this inner diameter are for instance between 100 and 200 mm. The quartz tubes are made of a quality (e.g. clear quartz) which has comparatively good heat conducting capability and strength. The tubes have a thickness of material of substantially 4-12 mm and a weight of, for example, substantially 6-7 kg.

The tube unit 13 is made of fire-resistant steel material. As will be noted from FIGS. 4a and 4c, the tube unit 13 has double walls along substantial parts of its longitudinal extent. By a double-walled tube unit it is meant in the present embodiment that the tube unit 13 consists in principle, of two tubes 13a and 13b which are separate from each other, and which are individually supported. However, the designation double-walled also includes the embodiment wherein the two coaxially arranged tubes are connected to each other. The tube unit 13 in question is somewhat shorter than the quartz tubes belonging to it, and in the present case has a length of approx. 4.2 meters, the tube unit then being double-walled from its lower parts up to 25-70% of its height. A space defined between confronting walls of the tubes 13a and 13b is designated 13c.

Referring again to FIGS. 2a and 2b, it is noted that the furnace comprises a combustion chamber 14, in which the injected oil is mixed with air and combusted. The returned heating gases are directed into the furnace so that they will come in front of the flame. The quartz tubes and tube units extend with sections past the combustion chamber 14, and the tube units 13 have flame guards 15 on the outside. Lower parts of the quartz tubes are sealed and extend through the lower part of the furnace and down into the vessel or container 2. The seals, which are symbolized by inter alia 16 will be described in more detail in the following. The tube units 13 are substantially fixed inside the furnace. At their upper ends, both the quartz tubes and the tube units 13 belonging to them extend through further seals identified by 17 and described in the following, which separate the combustion chamber 14 of the furnace from an outlet channel 18, which is connected to the abovementioned combustion gas fan 7 (FIG. 1). The quartz tubes 12 also extend entirely through the outlet channel 18 and up and through a fastening unit 19 which primarily holds the quartz tubes transversally fixed, but also achieves a seal between the combustion gas outlet 18 and the atmosphere. Furthermore, in the embodiment shown, the tube units 13 are supported at 29 by means of supporting plates described in the following which coact with the outsides of the outer walls of the tube units. In certain embodiments, however, it is appropriate to eliminate the supporting plates entirely.

The double wall of the tube unit 13 extends substantially to a level coinciding with the bottom plate 14a of the combustion chamber, which means that the above-mentioned space 13c is in direct connection with the combustion chamber 14. As will be noted from FIG. 2a, the quartz tube 12 is arranged in its tube unit 13 with play in relation to the inner wall of the tube of tube unit 13, which is designated 20 in FIG. 2a. The space between said inner wall (13b in FIG. 4b) and the outside of the quartz tube 12 is connected with the space between the double walls 13a, 13b of the supporting tube 13 at the lower parts of the quartz tubes and the tube 13 unit via connection holes made in the inner wall 13b of the tube unit 13. The connection holes are designated 21 in FIGS. 4a and 4d. There are 8 layers of holes, with 12 holes per layer. Through the arrangement shown with quartz tubes 12 and the surrounding tube unit 13, the space 13c between the walls of the tube unit can serve as an outer flow channel for said combustion gases and the space between the quartz tube 12 and the inner wall 13b of the tube unit can serve as an inner flow channel for the same combustion gases, with the outer and inner flow channels connected via said connection holes 21. The outer and inner flow channels are parallel to and encircle the quartz tube 12. As the inner flow channel merges into the outlet channel 18 said combustion gas suction fan 7 will achieve convective movement of the heating gases which have been heated in the combustion chamber and then forced down by suction into the outer flow channel, via the connection holes 21 and into and up in the inner flow channel and from there on out into the outlet channel 18. Through the counter-current convection obtained in the first and second flow channels, it will be possible for heat conduction to take place to the inner of the quartz tube, through said convection, and also through direct heat radiation from the heated parts of the supporting tube. The fan and the flow channels are adapted so that a speed of the combustion gases of 20-50 meters per second is obtained. The gas flow is cooled down successively during its passage through said flow channels and the heat conduction to the quartz tube through convection decreases successively. However, there is also the radiation heat. Through its radiation, the outer wall of the tube unit emits heat to the inner wall of the tube unit, and this, in turn, emits radiation heat to the quartz tube. The sum of the convection heat and the radiation heat will be more or less constant along a large portion of the length of the quartz tube, and in this way very uniform heating is obtained.

Also the heating of the substantially firmly fastened tube unit takes place uniformly, which involves that the walls of the tube unit will not bend and in this way affect the quartz tube inside, which is sensitive to mechanical stresses.

The quartz tube is centered in the tube unit at said seals 16, and also at the fastening unit 19. The tube rests with the major portion of its weight against a seat extending out and arranged in connection with the seal, so that a certain ball-bearing function is obtained in the support in question.

Figure 4B:
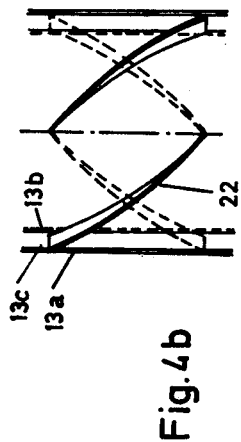
Figure 4C:
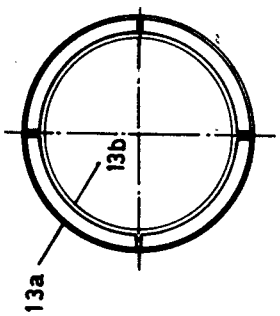
Figure 4D:
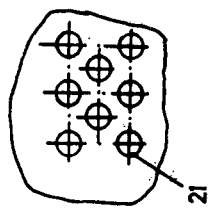
Figure 4A:
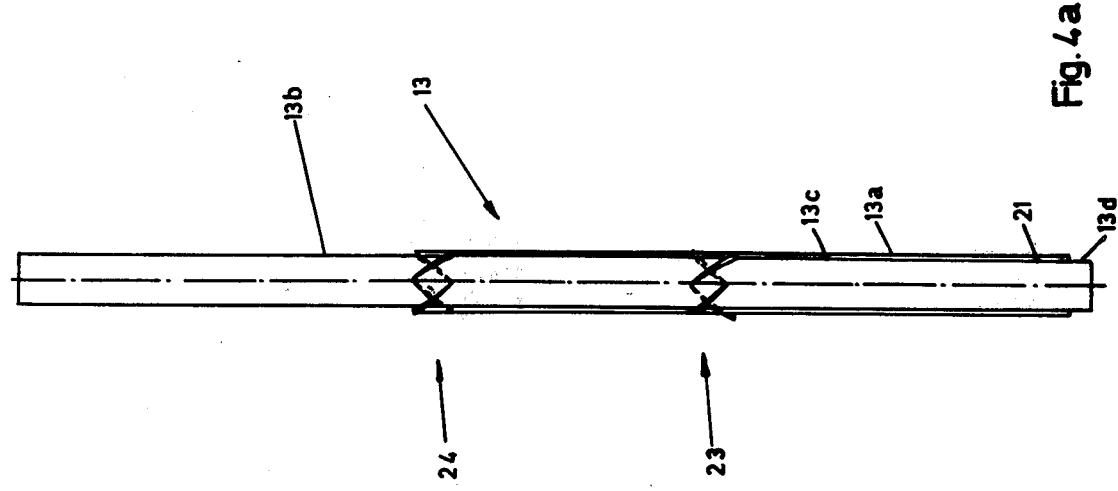
FIG. 4a shows a vertical view of a tube unit for the quartz tube according to FIG. 3.

In order to achieve further improved distribution of the heat and heat conductivity at the quartz tubes and the tube units, as shown in FIGS. 4a–4c guide vanes 22 are arranged across the space 13c of the outer flow channel so that a vigorous turbulation of the heating gases is obtained in said outer flow channel. In the example of the embodiment shown, said guide vanes 22 are arranged at two different levels 23 and 24 on the tube unit. At each level, four guide vanes coact in the turbulation function, and each guide vane is then somewhat curved in its own plane and extends approx. 45° from a cross-section plane through the supporting tube at the end in question of the guide vane. Each guide vane covers one fourth of the circumference of the space and is fastened along one of its longitudinal sides to the inside of the wall 13a. The guide vane does not extend entirely over the whole of the space 13c, but only between 80-95% of this. To a certain extent, the guide vanes will serve as bracing elements for the walls in the tube unit.

Figure 2A:
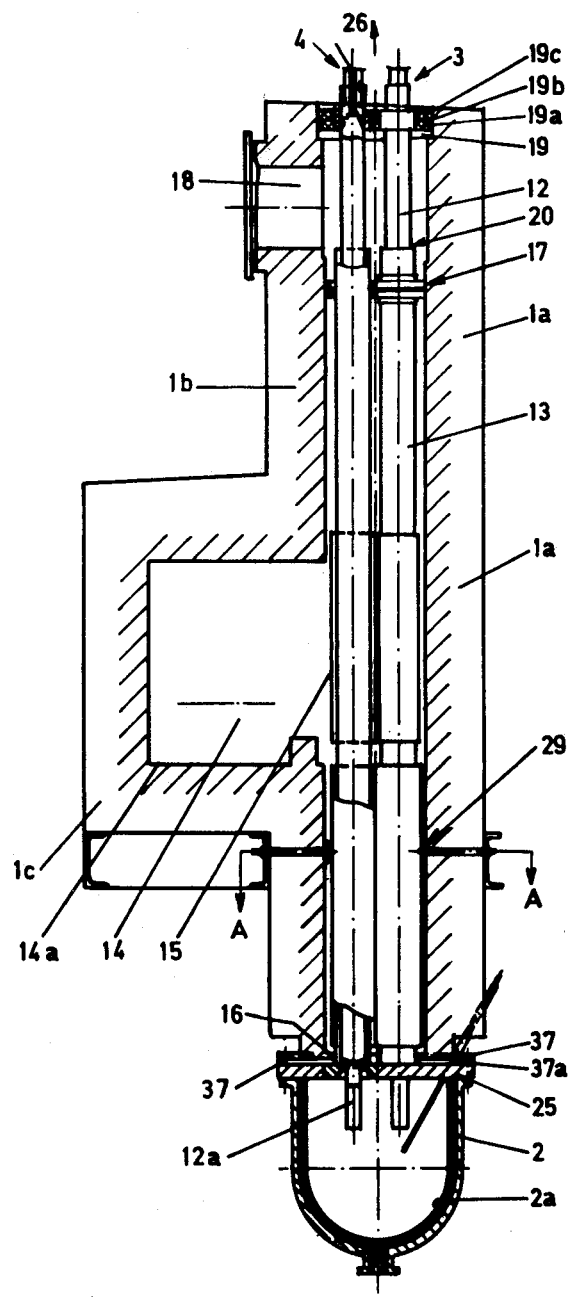
FIGS. 2a–2b show vertical sections turned 90° in relation to each other of the embodiment of a design of the concentration device in the system according to FIG. 1.

Each tube unit 13 is held via its inner wall via a protruding part 13d of the inner wall at the lower part of the tube unit in a fire-resistant cast iron plate 25, which is shown in FIG. 2a.

The inlets 3 and 4 for the acid which has been fed in comprise spreading devices 26 which spray the acid against the inner wall of the quartz tube in question, so that it runs downwards along the inner wall.

Figure 3:
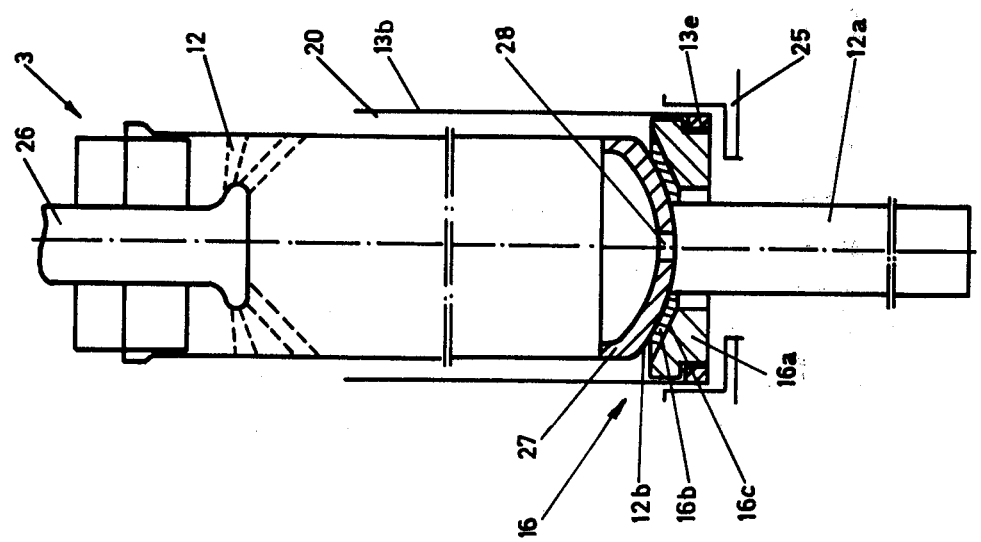
FIG. 3 shows a vertical section including, inter alia, a quartz tube comprised in the concentration device according to FIGS. 2a–2b.

As shown in FIG. 3, the seals 16 comprise a first sealing ring 16a made of quartz or the like. Said first sealing ring 16a rests against a flange 13e extending inwardly from the tube unit 13. On top of the first sealing ring a second sealing ring includes a shoulder 16b of quartz fibre or the like is arranged, which makes contact with the first sealing ring via an oblique surface 16c. At the bottom, the quartz tube 12 has a considerably tapered part 12a, for forming a wide spherical segment contacting shoulder 16b. At said tapered part, inside the quartz tube, a bowl shaped reinforcing element 27 is arranged, which is fastened in the inner wall of the quartz tube. Said reinforcing element comprises a central outlet hole 28, which leads down into said tapered part.

Said tapered part 12a extends down into the collecting vessel to between 30 and 60% of the height of this, appropriately 40%, the height of the vessel then being between 10 and 20%, preferably 15%, of the length of the quartz tube.

Figure 5:
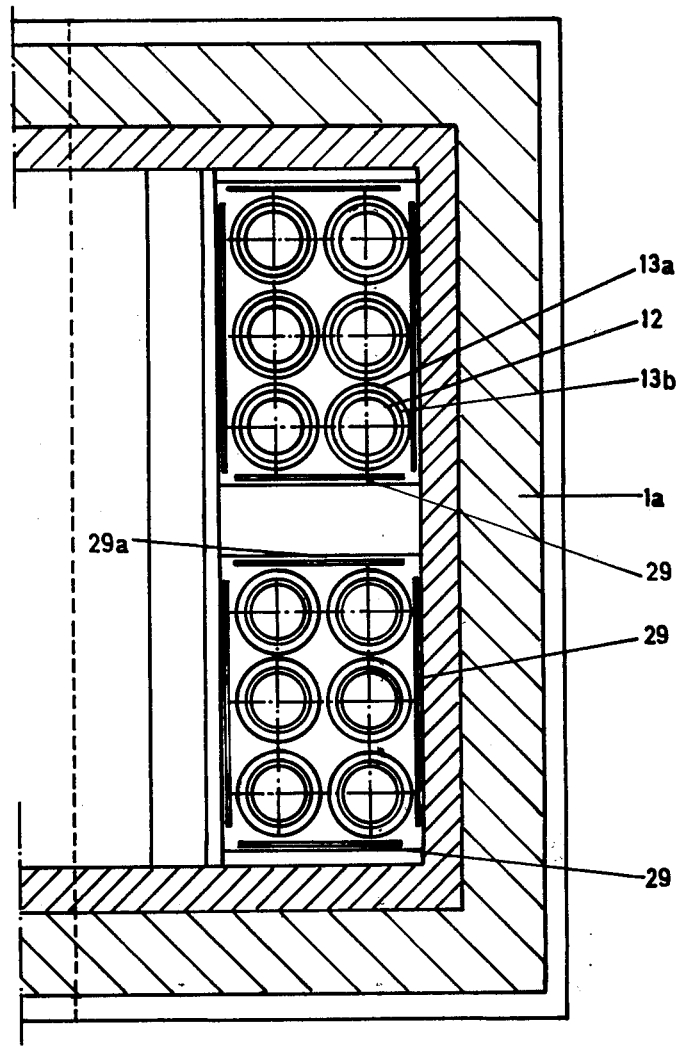

FIG. 2a shows the boundary walls of the furnace, designated 1a, 1b and 1c. FIG. 5 is intended to show the quartz tubes 12 used in certain embodiments with their tube units 13 in the supporting plates 29 bracing the respective modular unit, of which there are four for each modular unit, and which enclose the tubes comprised in the modular unit in a square. Said supporting plates 29 coact with the outsides of the tube units 13, which are moreover in contact with each other so that a tube package is formed. In the case of the two separate tubes in the double walled tube unit, the outer tubes or the outer walls 13a can be fastened by means of screws 29a in said supporting plates.

Figure 2B:
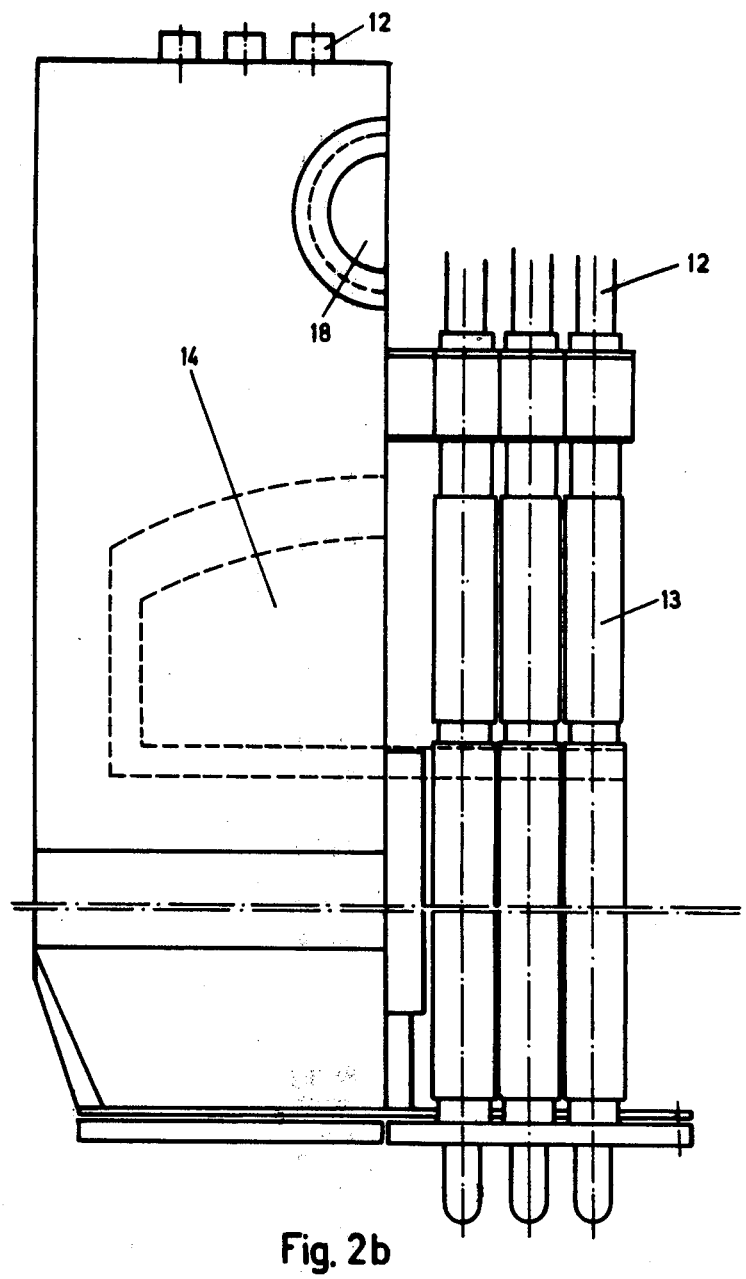
Figure 6B:
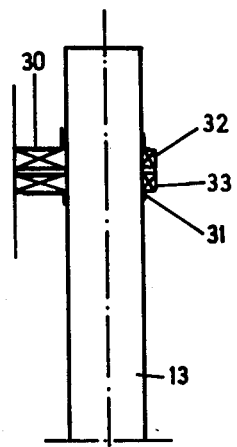
Figure 6C:
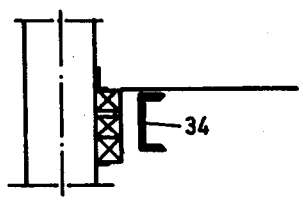
Figure 6A:
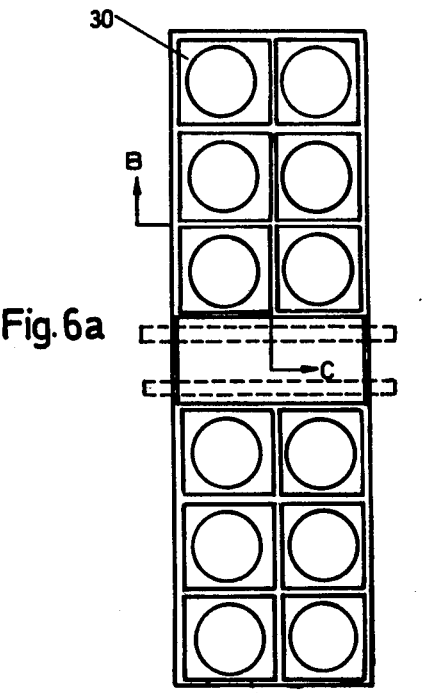

FIGS. 6a-6c are intended to show the seals 17 according to FIG. 2b in detail. The seals are inserted between two plates 30 and 31, of heat-resisting material which are provided with recesses. The actual heat seal comprises a ceramic felt 32, under which is applied a sealing plate 33 (Trito Board). The seals are supported by two beams 34 arranged over the space in question in the furnace. It is essential for the seals in question that they support the tube units 13 laterally, at the same time as they permit at least a certain longitudinal displacement of the tube units 13 in their longitudinal directions.

As regards the seals at the upper and lower parts of the furnace, these can consist of plates 19 and 25, respectively, appropriately of cast iron, in which such holes have been made that the respective quartz tube 12 can be displaced axially in these holes. On top of e.g. the plate 19 a porous acid-resistant material, e.g. quartz wool 19a can be applied. On top of this porous acid-resistant material a further acid-resistant material can be arranged, which can give tight layers 19b, 19c, and for instance consist of ceramic felt, quartz sand with an appropriate grain distribution, board, etc. On top of the cast iron plate 25 a flanged plate 37 is applied, which is in contact with the plate 25 via insulating material. The vessel is sealed against the underside of the plate 25 in the corresponding way. The parts 25, 37 and 2 are held together by means of bolts.

In order to further increase the heat transmission to the acid fed into the quartz tube 12, in a first example of an embodiment the use of packings which are known in themselves and which are applied inside the quartz tubes is proposed. Said packings give a larger total area and, accordingly, better rectification. The temperature at the top of the tube units can thereby be kept lower, which is of importance for the durability of the seals used at the top of the furnace.

With small packings, however, the risk for flooding of the liquid which runs down in the tube is increased, as in this case the liquid can be carried along and be dammed up by the gas flow directed upwards which occurs. This can be followed by a wave of liquid, resulting in irregular boiling. However, a prerequisite for flooding is a high gas speed. The gas speed is nearly zero at the bottom of the respective quartz tube, and increases in relation to the heat conducted to a maximum at the top of the quartz tube.

With the ratios prevailing between liquid and gas at the top of the tube unit, the flow speed, i.e. the gas speed at which flooding can take place, with 25 mm packings is 2.5-3.0 m/sec., with 40 mm packings 3-4 m/sec., and with 50 mm packings 4-5 m/sec.

In the present case, the gas speed is calculated to be approx. 2.5 m/sec. at the top of the tube unit 13. At total evaporation of the liquid fed in, however, the gas speed may increase to twice this speed. However, total evaporation takes place only in exceptional cases.

In case packings are to be placed in the entire quartz tube in the embodiment mentioned above, the packings at the top should not have a diameter of less than 40 mm. Up to half of the height of the quartz tubes, packings with a diameter of 25 mm can be used.

In certain embodiments it is also possible to limit the height of the packing layer, so that at the top of the packing layer a maximum gas speed of 1.5 to 2.0 m/sec. will be obtained. The liquid is then sprayed against the walls of the quartz tube with the aid of the spreading device 26 in the top of the quartz tube. Water is removed from the liquid which runs along the walls. When the liquid comes into contact with the layer of packings, the gas speed is adapted to 1.5-2.0 m/sec. so that the liquid is partly spread out over the layer of packings, i.e. the gas speed is adapted so that good spreading, but no flooding, takes place.

Figure 7A:
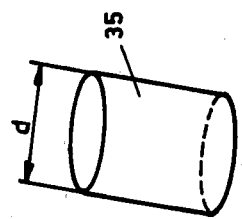
FIGS. 7a–7b show perspective and vertical sections of two embodiments of packings utilized in the concentration device.
Figure 7B:

FIGS. 7a and 7b show examples of shapes of two different embodiments of packings, 35 and 36.

The packings consist of pieces of quartz tubes, for instance pieces of clear quartz tubes, which in the following will be specified in three different dimensions, small dimensions, medium dimensions and large dimensions. By small dimensions of the packings is meant those which have a greatest extent of between one twentieth and one eigth, preferably one tenth of the inner diameter of the quartz tube in question. Medium sized packings are the pieces of quartz tube which have a maximum extent of between one eigth and one fifth, preferably one sixth, of the inner diameter of the quartz tube in question. By large packings is meant the pieces of quartz tube which have a maximum extent of between one fourth and one half, preferably one third, of the inner diameter of the long quartz tubes. Said pieces of quartz tube have substantially the same diameter and length, and can have the form shown by 35 in FIG. 7a.

According to the embodiment shown in FIG. 7b, the packing consists of a hemispheric body, appropriately of quartz, in which holes have been made in or in the vicinity of the top of the dome, and which hemispheric body is placed with the large open part at least substantially downwards in the quartz tube. When a plurality of such hemispheric bodies is used, these are placed at a distance of from 100 to 500 mm, preferably approx. 250 mm, from each other.

Figure 8:
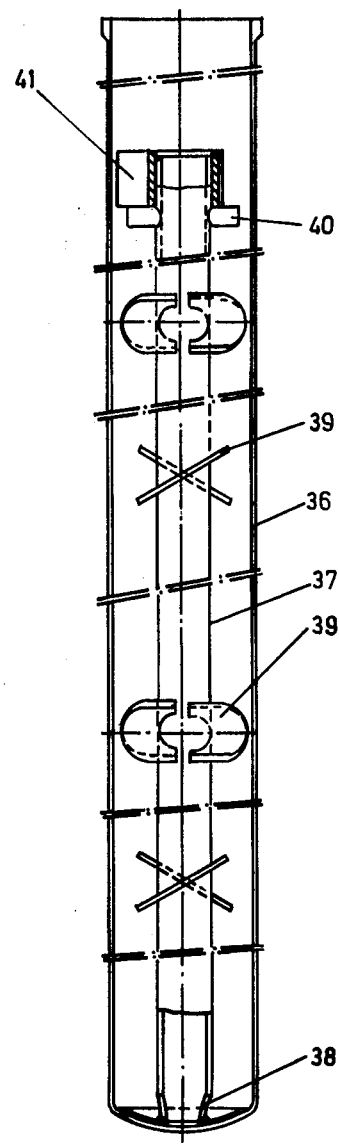
FIG. 8 shows a vertical section of a modified embodiment of a quartz tube providing an alternative to the use of packings.

At the concentration of sulphuric acid which contains certain metal salts, in the example with packings, these can become coated, which involves that the packings may be burned together and/or to the quartz tube. In cases when this problem is present, as an alternative to packings, a quartz tube which is known in itself according to FIG. 8 can be used. In principle, said quartz tube consists of an outer tube 36 and an inner tube 37, and the spaces in the tubes are connected to each other via connection holes 38. On the inner tube, at different height levels, plates are arranged obliquely, which give the gases rising in the quartz tube rotating movements. The upward gas flow will carry along drops of liquid, and will keep the inner wall of the quartz tube (the inner wall of the outer tube) uniformly moistened. The function will be dependent on the rotating speed, which can be adapted through a choice of dimensions of the inner tube and the angle of pitch, which is the angle which the obliquely set means has in relation to a cross section plane through the quartz tube. With a pitch angle of e.g. 30 degrees and with a 50 mm inner tube, the vertical gas speed in the present case (quartz tube 140×4; evaporated quantity of water 64 kg/h; (250° C.) at a height level of 1 meter of the tube, will be approx. 0.8 m/sec. The curve in question is straight up to a height level of 3 m, where the gas speed is approx. 2.5 m/sec. The curve is broken at the last-mentioned value, and at a height level of 5 m, the gas speed is approx. 3.6 m/sec. At its upper parts, the inner tube is also provided with lifting lugs 40 and a supporting sleeve 41.

The device for concentration of for instance sulphuric acid is arranged in such a way that it is a simple matter to choose the quartz tubes, i.e. quartz tubes for packings or quartz tubes for internal rotation of rising gases.

In the furnace which can be heated and the collecting vessel connected to it for concentrated acid, on one side the space which is intended for the heating means (the combustion gases) and on the other side the spaces over and/or under the respective seals are connected to pressure regulating equipment not specially shown which achieves that the pressure in the space for the combustion gas used for the heating is somewhat higher than the pressure in the other space or spaces. The pressure regulation in question can be achieved through a setting of the outlet of combustion gases from the system, and also through a setting of the sucking off from the collecting vessel 2. The outlet of combustion gases is regulated with a flow, not shown, so that a pressure near atmospheric pressure is obtained in the combustion chamber. The sucking off of acid fumes from the collecting vessel is set by means of a fan so that a vacuum is obtained in the collecting vessel. The arrangement described above functions well even in case the seals 16 should not function entirely satisfactorily and because of this combustion gases enter into the collecting vessel and are sucked off from it. In the latter case, the pressure difference prevents acid fumes from entering into the combustion gas space and causing corrosion damage.

When the device is started, the heating should appropriately take place slowly, so that temperature shocks which might lead to thermal rupturing are avoided. In the combustion chamber the working temperature is approx. 900° C., while the temperature in the outlet channel 18 is approx. 500° C.

Because the concentration of acids may be heavily contaminated by metal salts, the concentration should not be driven so far that the metal salts are precipitated on the quartz tubes. The last part of the concentration can then take place by conducting heat to the collecting vessel 2 for the acid. For this last concentration, however, only a small portion of the total quantity of heat is required. As an example of this may be mentioned that 50% suplhuric acid fed in to the quartz tube is concentrated to 90%, after which the final concentration takes place in the collecting vessel to a concentration of 95%. For the concentration of 1000 kg 50% $H_2SO_4$ (60° C.) to 90%, a quantity of heat of approx. 350 000 kcal=1.-46·$10^6$ kJ is required. For the continued concentration up to 95%, 35 000 kcal=1.5·$10^5$ kJ is required. The last-mentioned quantity of heat can be conducted in for instance through electric heating by means of a heating jacket 2a (FIG. 2a) of the bottom of the collecting vessel. In order to prevent precipitation of the salts then in the collecting vessel, this is connected to a cooler, through which the acid is drained off. In this case, the vessel is also provided with a pipe for conducting off combustion gases to the top of the furnace.

The invention is not limited to the embodiment shown above as an example, but can be subject to modifications within the scope of the following claims.

We claim:

1. An apparatus for concentrating and purifying corrosive liquids such as sulphuric acid and the like, comprising:

at least one elongated tube having first and second open end portions interconnected by an intermediate portion;

means for supporting said tube such that said open first end portion is in fluid communication with a concentrated source of said corrosive liquid sulphuric acid or the like, said open second end portion is in fluid communication with a collecting vessel or the like capable of receiving said corrosive liquid, with said first end portion being positioned substantially vertically above said second end portion;

channel means arranged for conveying hot gases in a counter-current manner adjacent a portion of said intermediate tube portion to provide for heat transfer therebetween, said channel means comprising inner and outer flow channels each surrounding a portion of said intermediate tube portion, with a vertically lowermost portion of said outer channel being in direct fluid communication with a vertically lowermost portion of said inner channel and said inner channel surrounding and directly confronting said intermediate tube portion to provide for convective heat transfer between hot gases flowing through said inner channel and corrosive liquids flowing through said confronting intermediate tube portion;

turbulation means mounted within at least one of said inner and outer flow channels for causing vigorous turbulation of hot gases flowing through said channel means, thereby providing substantially uniform transfer of heat between said turbulent hot gases and said intermediate tube portion; and means for drawing hot gases into a vertically upper portion of said outer channel causing said hot gases to flow in a generally vertical downward direction through said outer channel and subsequently flow in a generally vertical upward direction through said inner channel conveying heat by radiation and convection to said intermediate tube portion and any corrosive liquids and the like flowing therethrough.

2. An apparatus according to claim 1, wherein said turbulation means is mounted in said outer flow channel.

3. An apparatus according to claim 1, wherein a plurality of separate, elongated tubes each has an intermediate tube portion surrounded by channel means comprising inner and outer flow channels each surrounding a portion of said intermediate tube portion, with a vertical lowermost portion of each of said outer flow channels being in direct fluid communication with a vertical lowermost portion of a corresponding inner flow channel, each of said outer flow channels including turbulation means for causing vigorous turbulation of hot gases flowing through said respective channel means.

4. An apparatus according to claim 3, wherein each pair of inner and outer flow channels is separated from one another by a separate, substantially cylindrically-shaped common wall surrounding a portion of said intermediate tube portion, each of said common walls includes a plurality of apertures extending through a vertically lowermost portion to provide for direct fluid flow between said inner and outer flow channels.

5. An apparatus according to claim 3, wherein each elongated tube is formed of clear quartz material.

6. An apparatus according to claims 2 or 3, wherein said turbulation means comprises at least one guide vane mounted in each outer flow channel and extending at a substantially oblique direction relative to a longitudinal axis passing through said pair of flow channels forming said channel means.

7. An apparatus according to claim 6, wherein said turbulation means comprises a plurality of separate guide vanes mounted in each of said outer flow channels and each extending at a substantially oblique direction relative to a longitudinal axis passing through said pair of flow channels forming said channel means.

8. An apparatus according to claim 7, wherein each of said plurality of obliquely extending vanes is vertically spaced within said respective outer flow passageway from adjacently disposed vanes.

9. An apparatus according to claim 3, wherein said plurality of elongated tubes are each mounted within a furnace assembly, with each elongated tube extending vertically through said furnace, said apparatus further including upper and lower sealing means extending between vertical upper and lower end portions of each intermediate tube portion and an adjacent wall portion of said furnace assembly, thereby containing hot gases within a portion of said furnace in direct communication with said elongated tubes.

10. An apparatus according to claim 9, wherein said means comprises a suction fan in direct fluid communication with a vertically uppermost end portion of each of said inner flow channels, said suction fan selectively operable to draw said hot gases into a vertically uppermost end of each of said outer flow channels, through said outer flow channels and said inner channels with said hot gases functioning to heat by radiation and convection sulfuric acid flowing vertically downward through said elongated tubes.

11. An apparatus according to claim 10, wherein each of said inner flow channels has a vertical length greater than a surrounding outer flow channel, with a separate sealing assembly surrounding a vertically upper portion of each inner flow channel and contacting a wall portion of said furnace to prevent hot gases from escaping from said furnace under direct suction from said suction fan.

12. An apparatus according to claim 11, wherein a separate, cylindrically-shaped flame guard surrounds a portion of each inner channel extending vertically above its respective outer channel to protect said inner channel portion from direct contact with the hot gases generated within said furnace assembly.

13. An apparatus according to claim 10, wherein an output passageway extends from said suction fan into said furnace assembly, forcing hot gases initially drawn through said channel means to re-enter said furnace for recirculation through said channel means.

14. An apparatus according to claim 9, wherein the vertically lowermost end of each elongated tube includes a substantially spherically-shaped portion smoothly tapering into a substantially cylindrically-shaped end portion extending beyond said furnace assembly.

15. An apparatus according to claim 14, wherein said lower sealing means comprises a sealing assembly fixedly mounted in the opening of said furnace assembly, said sealing assembly including curved surface portions each complimentary in shape to one of said spherically-shaped tube portions, whereby each elongated tube contacts and is vertically supported on a portion of said lower sealing assembly.

16. An apparatus according to claim 9, wherein supporting plates are mounted in said furnace assembly and extend into contact with exterior surface portions of said outer flow channels to fixedly maintain said channel means in predetermined positions within said furnace.

17. An apparatus according to claim 3, wherein each of said elongated tubes includes packing means mounted within each of said tubes for directing a corrosive liquid against interior wall surfaces of said tubes to increase the surface area of the liquid receiving heat from said hot gases, thereby providing an increased rectification of said corrosive liquid flowing through said elongated tube.

18. An apparatus according to claim 17, wherein said packing means comprises a plurality of separate packing members each formed of quartz material and each having a concave surface confronting said source of corrosive liquid, with an aperture extending through said concave surface to allow residual gases to rise therethrough.

19. An apparatus according to claim 17, wherein said packing means comprises a plurality of separate, cylindrically-shaped plug members each formed of quartz and mounted in said elongated tube.

20. An apparatus according to claim 3, wherein each of said elongated tubes includes an outer tube surrounding and spaced from an inner tube, with said inner and outer tubes being in joint fluid communication with one another,
- a plurality of plates surround each of the inner said tubes, with the plates extending in a substantially oblique direction relative to a longitudinal axis extending through said tubes,
- wherein said plurality of obliquely extending plates cause rotation of gases rising within a space defined between said inner and outer tubes, thereby ensuring a substantially uniform moistening of an inner wall surface of said outer tube as required to maximize the heat transfer from said hot gases.

21. An apparatus according to claim 3, wherein separate pluralities of said elongated tubes each form a modular unit, with each modular unit comprising six elongated tubes each surrounded by a separate pair of inner and outer flow channels.

22. An apparatus according to claim 1, wherein said collecting vessel includes heating means for selectively heating said corrosive liquid after passage through said at least one elongated tube to further concentrate said corrosive liquids,
- and cooling means mounted in an outlet extending from said collecting vessel for cooling said concentrated acid to prevent precipation of salts present within said collecting vessel.

* * * * *